United States Patent [19]
Howell et al.

[11] Patent Number: 5,450,593
[45] Date of Patent: Sep. 12, 1995

[54] METHOD AND SYSTEM FOR CONTROLLING ACCESS TO OBJECTS IN A DATA PROCESSING SYSTEM BASED ON TEMPORAL CONSTRAINTS

[75] Inventors: William E. Howell, Richland Hills; Hari N. Reddy, Grapevine, both of Tex.

[73] Assignee: International Business Machines Corp., Armonk, N.Y.

[21] Appl. No.: 993,283

[22] Filed: Dec. 18, 1992

[51] Int. Cl.6 .................. H04L 9/32; G06F 12/14; G06F 13/14
[52] U.S. Cl. ...................... 395/650; 380/25; 340/825.31; 364/231.4; 364/286.4; 364/286.5; 364/DIG. 1
[58] Field of Search .............. 395/725, 425, 325, 575, 395/700, 650; 380/4, 25, 23, 49; 340/825.31, 825.34

[56] References Cited
U.S. PATENT DOCUMENTS

| | | | |
|---|---|---|---|
| 4,216,375 | 8/1980 | Ulch et al. | 235/382 |
| 5,023,773 | 6/1991 | Baum et al. | 395/425 |
| 5,113,499 | 5/1992 | Ankney et al. | 395/325 |
| 5,136,712 | 8/1992 | Perazzoli et al. | 395/700 |
| 5,173,939 | 12/1992 | Abadi et al. | 380/25 |
| 5,263,165 | 11/1993 | Janis | 395/725 |
| 5,265,221 | 11/1993 | Miller | 395/725 |
| 5,283,830 | 2/1994 | Hinsley et al. | 380/25 |
| 5,287,519 | 2/1994 | Dayan et al. | 395/700 |

*Primary Examiner*—Gopal C. Ray
*Attorney, Agent, or Firm*—Geoffrey A. Mantooth

[57] ABSTRACT

Access by a security subject to an object on a data processing system is automatically controlled in accordance with a time based schedule. In accordance with times contained in the schedule, an access control list of an object is modified by either adding, to invoke access, or deleting, to revoke access, a security subject. The schedule is made up of one or more requests for single access or cyclical accesses that are stored in a request queue. The request queue is periodically polled to determine if any requests qualify for further processing. A request is processed if the time for changing the status of the security subject on the access control list, as specified by the request, is either the same as or less than the current time of the data processing system. Processing the request modifies the access control list by either adding or deleting the security subject to or from the access control list.

10 Claims, 8 Drawing Sheets

METHOD AND SYSTEM FOR CONTROLLING ACCESS TO OBJECTS IN A DATA PROCESSING SYSTEM BASED ON TEMPORAL CONSTRAINTS

SPECIFICATION

1. Field of the Invention

The present invention relates to methods and systems that limit access to various objects of data processing systems.

2. Background of the Invention

Data processing systems typically limit access to various aspects of the systems operation. For example, in an object oriented data processing system, each object has attached to it an access control list (ACL). Examples of objects include application programs, documents, voice and video files. An access control list is a list of security subjects or entities that are authorized to use the object. Examples of security subjects include end users, groups of end users and applications that access objects.

Prior art data processing systems use access control lists that are static in nature. Manual intervention by an administrator is required to keep the access control list of an object up to date. Thus, whenever a security subject needs access to a specific object, the administrator must manually add the security subject to the access control list of the object. Such a situation could occur when an employee is newly hired and begins using the data processing system and specific objects located in the system. Access is provided as soon as the administrator gets around to adding the security subject. Likewise, when a security subject's access to the object is to be revoked (for example when an employee resigns the company), then the administrator must manually modify the access control list by deleting the security subject. Revocation of access occurs when the administrator gets around to deleting the security subject from the access control list. In large data processing systems, the administrator is kept busy doing other tasks. Therefore, if the administrator forgets to revoke a security subject's access, the access is maintained.

Practicalities require a security subject's change in access to an object to be limited to invoking access for a long time or revoking access after a long time. Such manual intervention by the administrator may result in the change in access not being invoked or revoked in a timely manner. Thus, precise changing of access according to a time schedule is not possible because of the human intervention that is required. Furthermore, single accesses limited to a short period of time and cyclical or periodic accesses are unobtainable.

SUMMARY OF THE INVENTION

It is an object of the present invention to provide a method and system for automatically controlling access to objects of a data processing system, which access control is based on temporal constraints.

The method of the present invention controls access in a data processing system. A schedule of access for a security subject to access an object of the data processing system is provided. The schedule contains one or more times, for each time there being a corresponding change in the access of the security subject to the object. The method automatically determines if any one of the times in the schedule has occurred, and if so, then implements the access change that corresponds to the occurred time. If none of the times has yet occurred or if there are other times in the schedule that have not yet occurred, then the method repeats the step of automatically determining if any one of the times in the schedule has occurred, and if so, then implements the access change.

The data processing system of the present invention controls access and includes means for providing a schedule of access for a security subject to access an object of the data processing system. The schedule contains one or more times, and for each time there is a corresponding change in access of the security subject to the object. There is a means for determining if any one of the times in the schedule has occurred. There is also a means for implementing the access change that corresponds to the occurred time. The means for implementing is invoked by the means for determining upon the determination that one of the times has occurred.

The present invention allows a security subject, who has the proper authority (a requestor), to provide a schedule of access for particular objects in a data processing system. The schedule of access is in the form of one or more requests and contains one or more time for either invoking or revoking access to the object. Plural times can be provided so that access is invoked at a first time and then revoked at a subsequent, second time.

The present invention allows the requestor to provide a schedule of access before hand. The schedule will automatically be implemented at the specified times, thereby allowing the requestor to concentrate on other tasks. Because times are specified in the schedule, accuracy in when the access is invoked or revoked is obtained. Also, the present invention allows access to be frequently changed, for example on a daily basis. A single schedule can provide for cyclic or periodic access or access for a single period of time.

BRIEF DESCRIPTION OF THE DRAWINGS

FIGS. 2A and 2B show a request queue maintenance method which allows modification of a request queue. The request queue stores all of the temporal based requests for access change. FIG. 3 shows a method for polling and qualifying a request in the request queue. FIGS. 4A and 4B show a method for processing a qualified request. FIG. 5 shows a method of using the access control list for granting or denying a security subject access to an object.

DESCRIPTION OF THE PREFERRED EMBODIMENT

Figure 1:
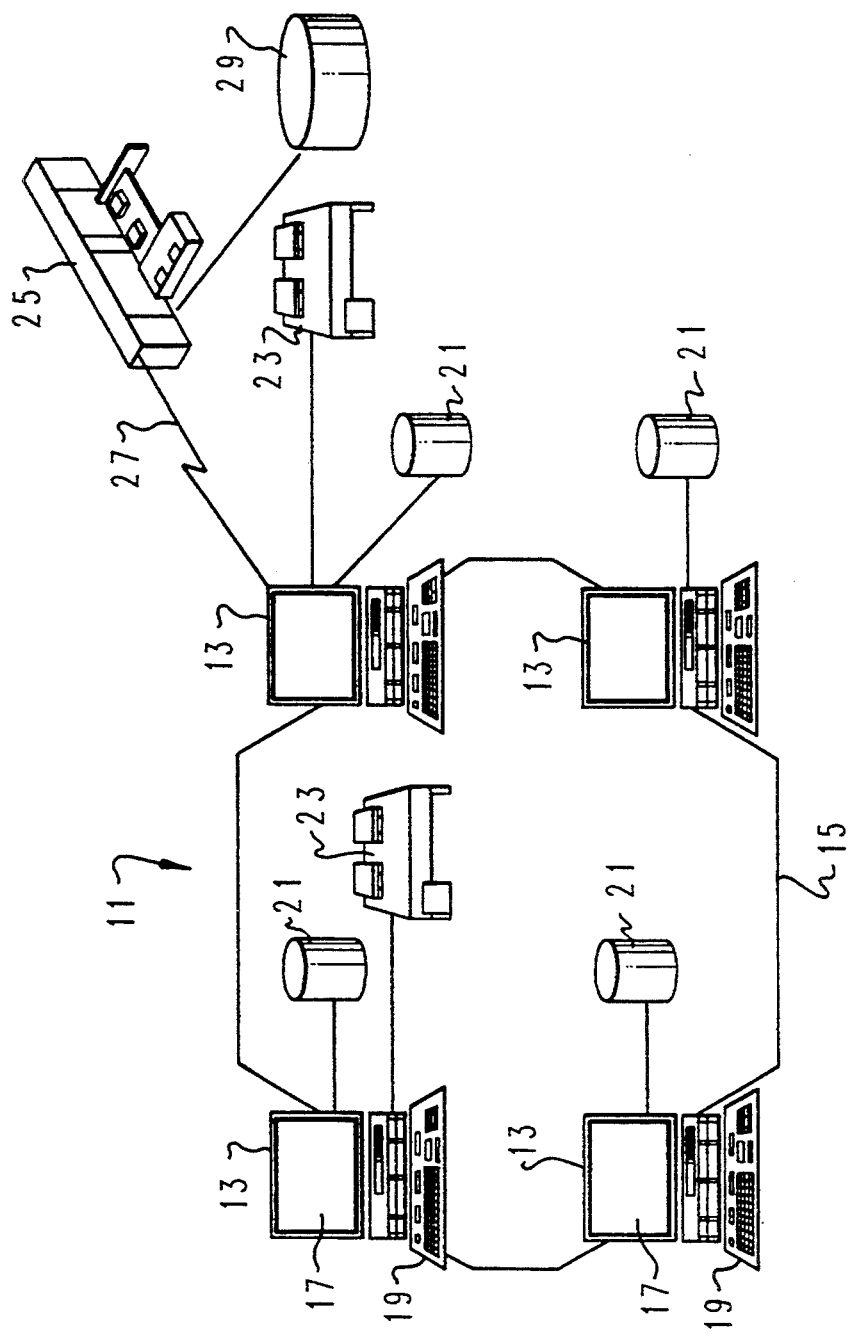
FIG. 1 is a schematic diagram of a data processing system on which the present invention can be practiced.

In FIG. 1, there is shown a schematic diagram of a data processing system 11, upon which the present invention can be practiced. The data processing system 11 includes plural individual computers 13 which are connected together in a local area network (LAN) 15. Each computer 13 includes a user interface, which has a display screen 17 and a keyboard 19. Each computer 13 may also be coupled to a storage device 21 and to a printer or output device 23. One or more of such storage devices 21 may be utilized, in accordance with the present invention, to store applications or resource objects which may be periodically accessed by any user within the data processing system 11.

The data processing system 11 may also include a mainframe computer 25 that is coupled to one of the computers by a communication link 27. The mainframe computer 25 may also be coupled to a storage device 29 which may serve as a remote storage for the computers.

The method of the present invention for controlling access based on temporal constraints will now be described with reference to the flow charts of FIGS. 2A–5. In the flow charts, the following graphical conventions are observed: a rectangle for either a process, function or screen display, a diamond for a decision and a circle for a connector in exiting to or entering from another part of the flow chart. These conventions are well understood by programmers skilled in the art of data processing and user interfaces and the flow charts are sufficient to enable a programmer skilled in the art to write code in any suitable computer programming language, such as BASIC, PASCAL or C for a computer such as the IBM Personal System/2 (PS/2) family of computers which supports these languages.

The data processing system 11 has located thereon numerous objects. Examples of objects include documents (text files), voice files and video files. Each object has associated with it an access control list (ACL). The access control list is a listing of security subjects that have access to that particular object. A security subject can be an end user, a group of end users and even application programs that access objects. The access control list contains levels of authorization for each security subject. For example, security subject A may have authorization to only read from the object. With a read only authorization, modification to the object is prohibited. However, security subject B may have authorization to both read and write to the object. Write authorization allows security subject B to modify the object. If the object is a document, such as a technical report, then security subject B can go into the report and make modifications to the text by adding, deleting and editing.

The present invention modifies the access control list of an object by adding a security subject (to invoke access to the object) or by deleting a security subject (to revoke access) at predetermined times. Modification of the access control list is performed in accordance with a schedule containing the times when access is to be invoked and revoked. The schedule is made up of one or more requests. Each request contains temporal constraint information, in the form of a specified time for either invoking or revoking access by a particular security subject for a particular object. The requests are contained in a request queue that is periodically polled to determine if there are any requests eligible for processing or executing. A request is eligible for processing when the current time of the data processing system is either equal to or greater than the time specified in the request for changing the status of the security subject on the access control list. Processing a request results in modifying the access control list by either adding or deleting a security subject.

A request contains the following parameters: a request action RA of either invoke access or revoke access, the identification OI of the object that is affected by the request action RA, the identification IDA of the security subject that is changing the authorization, the identification IDB of the security subject whose authorization is being changed, the beginning of the access schedule IR (initiate request), the end of the access schedule DR (delete request), a window of authorization IU (invoke units in some specified period of time such as hours), a window of non-authorization RU (revoke units), and a level of authorization AL (such as read or write). These parameters will be explained in more detail hereinbelow.

Figure 2A:
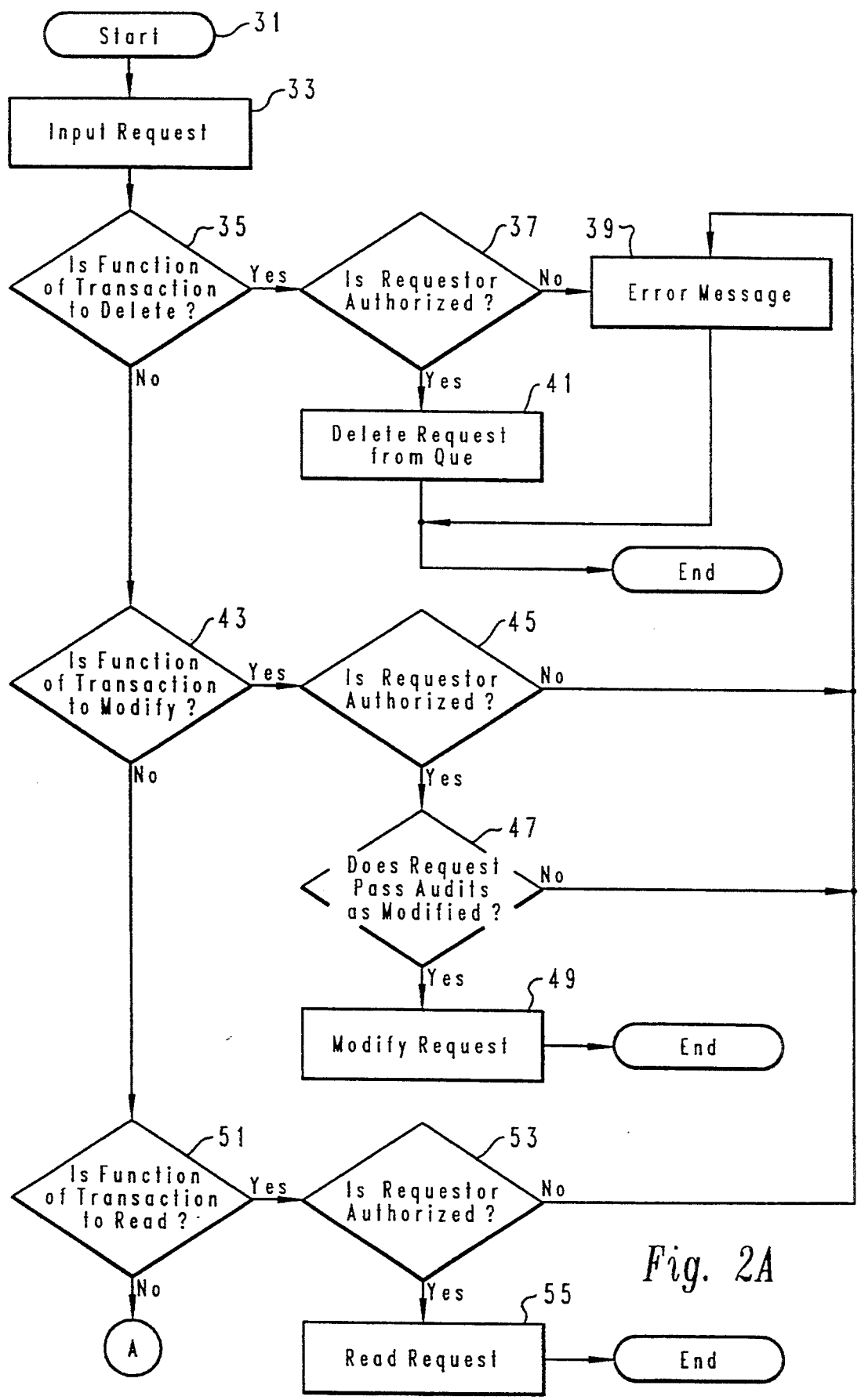
FIGS. 2A, 2B, 3, 4A, 4B and 5 are flow charts, showing the method of the present invention, in accordance with a preferred embodiment.
Figure 2B:
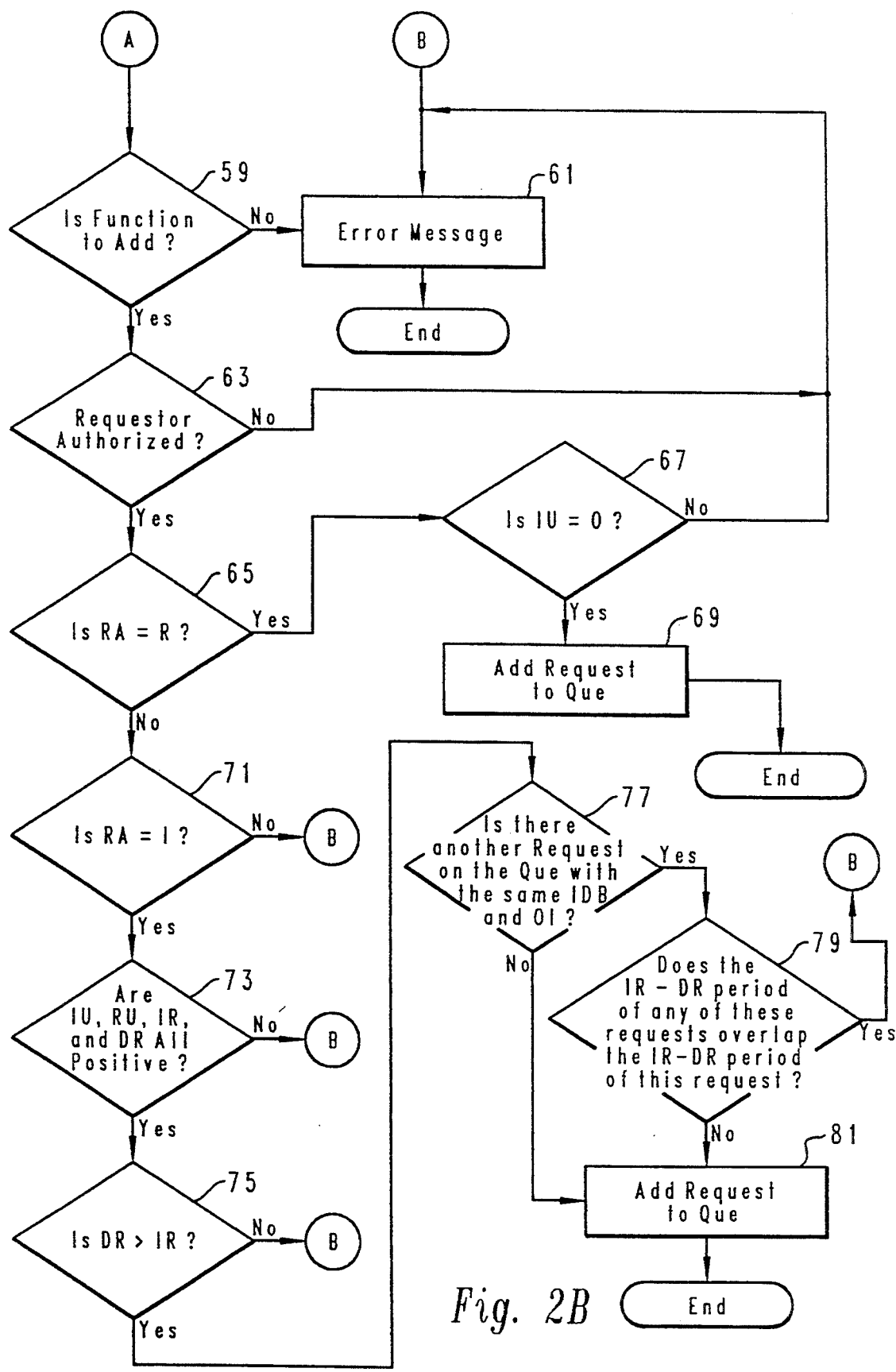

A request is added, modified or deleted from the request queue by the request queue maintenance method shown in FIGS. 2A and 2B. A requestor utilizes this method to update and add requests regarding an object. The requestor is typically a user who owns or has control over the object. The method of FIGS. 2A and 2B is a transaction oriented program that exists in the data processing system 11. Upon the receipt of a transaction, or a request, from a security subject, the method is executed, step 31. The request is input, step 33. In step 35, the method determines if the function of the transaction is to delete a request. If YES, then the method determines if the requestor is authorized to make the deletion, step 37. If NO, the requestor is not authorized, an error message is displayed, step 39 and the method ends. If YES, the requestor is authorized, then request is deleted from the request queue, step 41 and the method ends.

If the result of step 35 is NO, the transaction is not to delete a request, then the method proceeds to step 43, wherein it is determined if the function of the transaction is to modify a request. If YES, a request is to be modified, the method determines if the requestor is authorized, step 45. If the result of step 45 is NO, an error message is displayed, step 39. If YES, the requestor is authorized, then the method verifies the appropriateness of the request as modified, step 47. Specifically, for a request to be considered appropriate, there can be only a single request for a security subject per object during any given time. This avoids confusing the method with possibly conflicting requests. Furthermore, when adding or modifying a request, the end of schedule DR must always be greater (or later in time) than the beginning of schedule IR. Furtherstill, the beginning of schedule of IR, the end of schedule DR, the window of authorization IU and the window of non-authorization RU must not be negative, again to avoid confusing the method. If the result of step 47 is NO, the request as modified does not pass these audits, then an error message is displayed, step 39. However, if YES, the request as modified is considered appropriate, then the request is modified and returned to the request queue, step 49. This ends the method.

If the function of the transaction is not to delete or modify a request, the method determines if a user wants to read the request, step 51. If the result of step 51 is YES, the method determines if the requestor is authorized, step 53, and if so, reads the request and displays it to the requestor, step 55 and the method ends. However if the requestor is unauthorized, then an error message is displayed, step 39.

If the function of the transaction is not to delete, modify or read a request, then the method determines if the function is to add a request to the request queue, step 59. If the result of step 59 is NO, then an error message is displayed, step 61 and the method ends. If the result of step 59 is YES, then the method determines if the requestor is authorized, step 63. If NO, an error message is displayed, step 61. If YES, the method determines if the request action RA is revoke access, step 65. If the result of step 65 is YES, the method verifies if the window of authorization IU is zero, step 67. If YES, then the request is added to the request queue, step 69, and the method ends. If the result of step 67 is NO, an error message is displayed, step 61.

If the result of step 65 is NO, the method verifies if the request action RA is invoke, step 71. If NO, an error message is displayed, step 61, because the request action RA is either revoke or invoke. If the result of step 71 is YES, the method verifies if the beginning of schedule IR, the end of schedule DR, the window of authorization IU and the window of non-authorization RU are all positive, step 73. If NO, an error message is displayed, step 61. If YES, then the method then verifies if the end of schedule DR is greater than the beginning of schedule IR, step 75. If NO, an error message is displayed, step 61. If YES, then in step 77, the method determines if there is another request on the request queue with the same security subject IDB whose authorization is being changed for the same object OI. If YES, then in step 79, the method determines if the period of time between the beginning and end of schedules IR-DR of any of these requests on the request queue identified in step 77 overlap the period of time IR-DR of the request which is being processed to be added. If there is an overlap of time periods, the request being processed is not added to the request queue in order to avoid confusion and an error message is produced, step 61. If the result of either of step 77 or step 79 is NO, then the request passes the audits and is added to the request queue, step 81. The method then ends.

Thus, the method of FIGS. 2A and 2B allows requests in the request queue to be added, deleted and modified. The method also allows the request to be read to determine the contents of the request.

The request queue is periodically read to determine if any requests in the queue are in need of processing. A request is processed whenever the status of a security subject's access, or lack thereof, needs to be changed.

Figure 3:
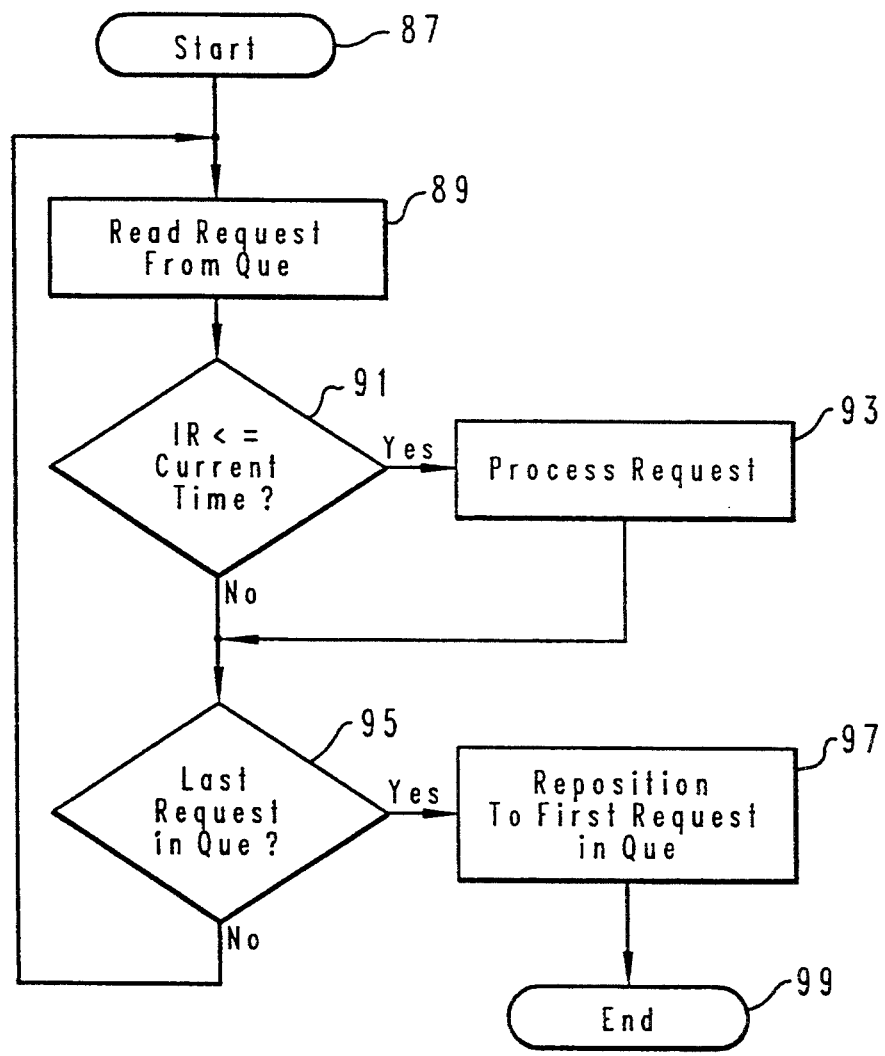

The method shown in FIG. 3 is a polling program that periodically reads the request queue. The polling program resides in memory in the data processing system 11. A scheduler program that is executed by the data processing system 11 executes the polling program in accordance with a predetermined schedule. For example, if the access control lists of the objects are to be updated every hour on the hour, then the scheduler program would execute the polling program every hour on the hour. When the polling program is executed, step 87, a request is read from the request queue, step 89. In step 91, the request is checked to determine if it qualifies for processing by determining if the beginning of schedule IR is less than or equal to (earlier than) current local time. Current time is maintained by a clock in the data processing system 11. If the result of step 91 is YES, the request qualifies for processing, then it is processed in such a way so as to change the status of the security subject on the access control list of the particular object identified in the request, step 93. Processing of the request either adds or deletes the security subject in the request to the particular access control list, as will be explained in more detail hereinbelow with reference to FIGS. 4A and 4B. After the request is processed to modify the particular access control list, the method of FIG. 3 proceeds to step 95.

If the result of step 91 is NO, the request is not qualified for processing, then in step 95, the method determines if the entire request queue has been read. If NO, the request that has been read is not the last request in the request queue, the method loops back to step 89 to continue going through the request queue. If the result of step 95 is YES, the entire request queue has been read, then the pointer that identifies which request has been read is repositioned to the first request in the queue, step 97. This readies the request queue for the next polling, which under the example would be the next hour on the hour. The method then ends, step 99.

Figure 4A:
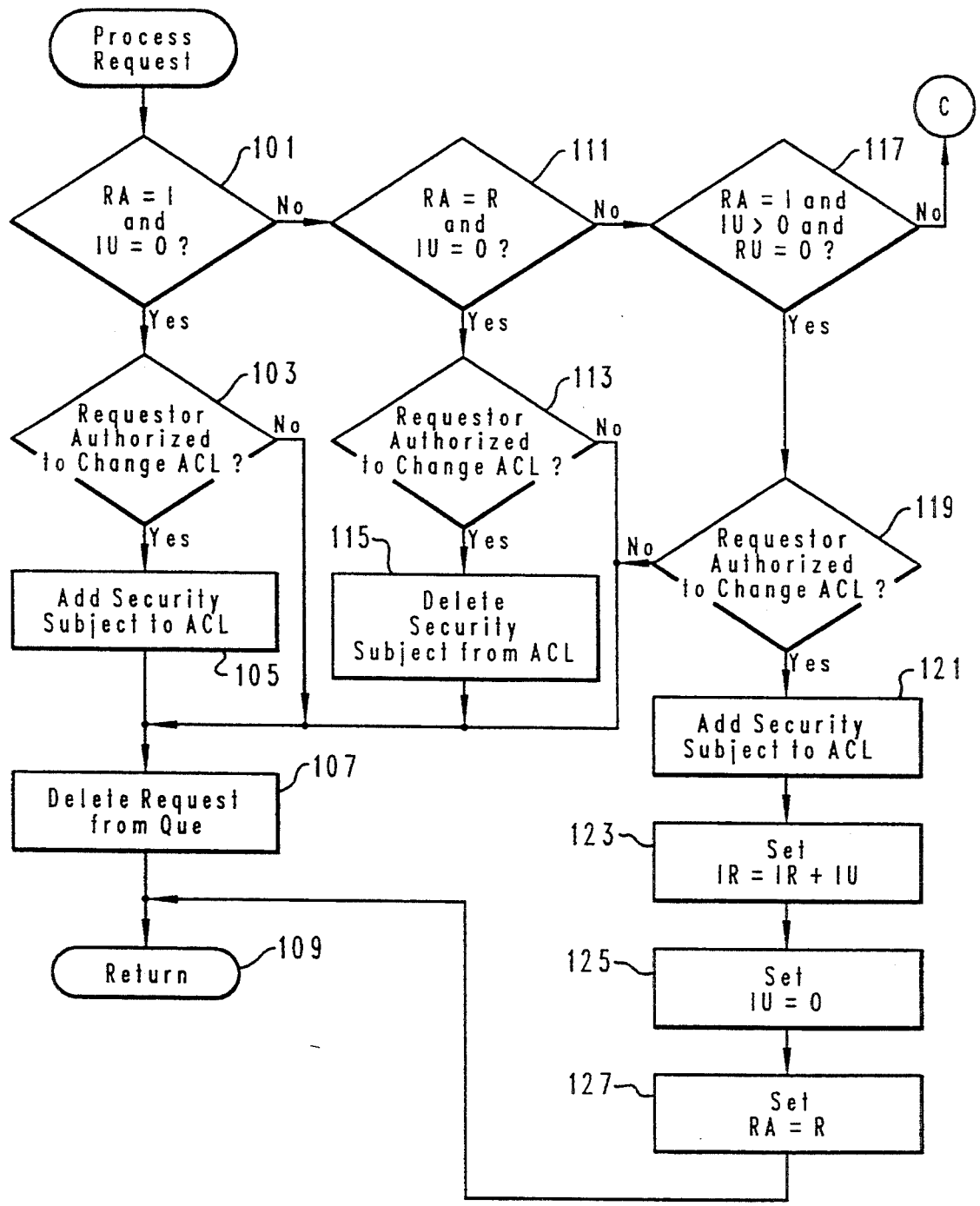
Figure 4B:
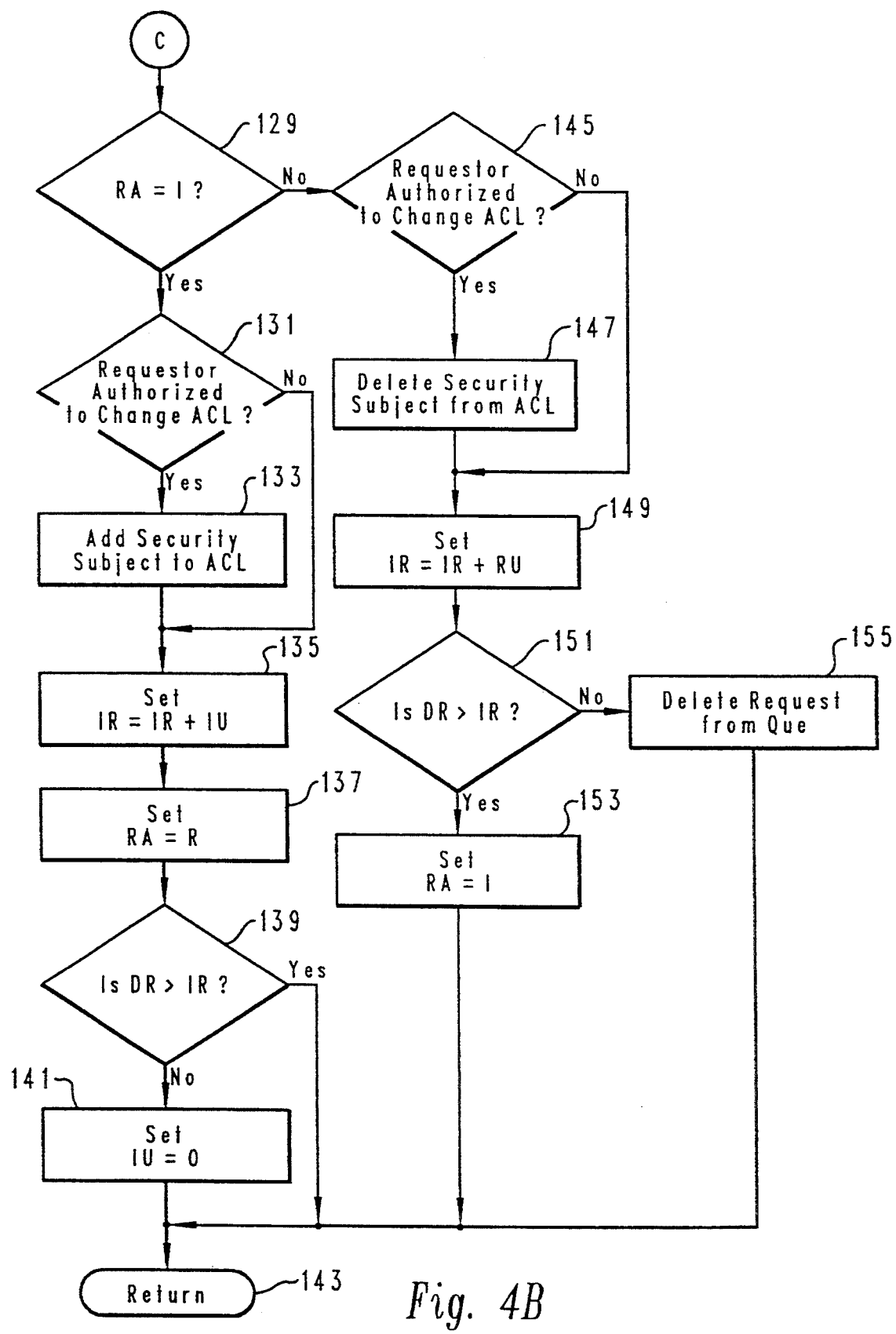

Referring now to FIGS. 4A and 4B, the method of processing a request will be discussed. This method is called by step 93 of FIG. 3. The present invention allows several different types of access to be utilized. Prolonged or infinite access is granted to a security subject from when the request for such access is processed to an undetermined time in the future. An infinite access can be revoked by a request for explicit revocation. A security subject can be given access for a single period of time as defined by a beginning of schedule IR and an end of schedule DR. A security subject can also be given a cyclic access that begins and ends at specified times and that repeats on a periodic basis for a predetermined amount of time.

In step 101, the method determines if the request is for infinite access. Such a request has its request action RA=invoke and its window of authorization IU=0. If the result of step 101 is NO, then the method proceeds to step 111. However, if the result of step 101 is YES, then the method determines if the requestor IDA is authorized to change the access control list for the particular object, step 103. The requestor is authorized if the requestor is listed on the access control list and has the appropriate level of authorization. If the requestor is authorized, then the security subject IDB is added to the access control list, step 105. The request is deleted from the queue, step 107, to prevent further processing of the request. If the result of step 103 is NO, the requestor is not authorized, then the request is deleted from the request queue, step 105. The method then returns, step 109, to the polling program of FIG. 3.

In step 111, the method determines if the request is for revocation of access. A revocation request has its request action RA=revoke and its window of authorization IU=0. If the result of step 111 is NO, then the method proceeds to step 117. However, if the result of step 111 is YES, then the method determines if the requestor IDA is authorized to change the access control list, step 113. If NO, the requestor is not authorized, then the request is deleted from the request queue, step 107. If the requestor is authorized, then the security subject is deleted from the access control list, step 115. The request is then deleted from the request queue, step 107 and the method returns to the polling program, step 109.

In step 117, the method determines if the request is for a single access period. A single access request has its request action RA=invoke, its window of authorization IU greater than 0 and its window of non-authorization RU=0. If the result of step 117 is NO, then the method proceeds to step 129 (FIG. 4B). However, if the result of step 117 is YES, then the method determines if the requestor IDA has authorization to change the access control list. If the result of step 119 is NO, then the request is deleted from the queue, step 107. If the requestor is authorized, then the security subject is added to the access control list, step 121. In step 123, the beginning of schedule IR is advanced in time by an amount of time equal to the window of authorization IU. As will be illustrated in examples below, this redefining of the beginning of schedule IR allows the request to be processed at the close of the window of authorization in order to revoke access. In step 125, the window of authorization IU is set to 0, and in step 127, the request action RA is set to revoke. These last two steps serve to qualify the request for a revocation action in step 111, when the request is processed at the close of the window of authorization. After step 127, the method returns to the polling program, step 109.

If the result of step 117 is NO, then it is assumed that the request is for cyclic access. In step 129 (FIG. 4B), the method determines if access is to be invoked or revoked by examining the request action RA. If RA=invoke, then the method determines if the requestor IDA is authorized to change the access control list, step 131. If the result of step 131 is YES, the security subject is added to the access control list, step 133. If the result of step 131 is NO, step 133 is bypassed to step 135. In step 135, the beginning of schedule IR is advanced by the window of authorization IU. The request action RA is set to revoke, step 137. The method, in step 139, determines if the end of schedule DR is greater than the beginning of schedule IR. If NO, then the method sets the window of authorization IU=0, step 141, for revocation, and the method returns to the polling program, step 143. If the result of step 139 is YES, then the method returns, step 143.

Returning to step 129 at the top of FIG. 4B, if the result is NO, then the request action RA is revoke. In step 145, the method determines if the requestor is authorized to change the access control list. If the result of step 145 is YES, then in step 147, the security subject is deleted from the access control list and the method proceeds to step 149. If the result of step 145 is NO, then step 147 is bypassed. In step 149, the beginning of schedule IR is advanced by an amount of time equal to the window of non-authorization RU. The method then determines in step 151 if the end of schedule DR is greater than the end of schedule IR. If the result of step 151 is YES, then the request action RA is set to invoke, step 153, and the method returns to the polling program, step 143. If the result of step 151 is NO, then the request is deleted from the queue, step 155 and the method returns, step 143.

The access control list of an object is utilized whenever access to that object is requested. The access control list may contain from one to n security subjects and their level of access to the object (i.e. read only, read and modify, read and modify and delete, special access rights to the access control list). Each time an object manager is asked by a security subject to provide access to the object, the access control list is searched for the security subject's identifier. If the security subject's identifier is not found or if the access rights are not appropriate for the access being requested, then the security subject is denied access to the object.

Figure 5:
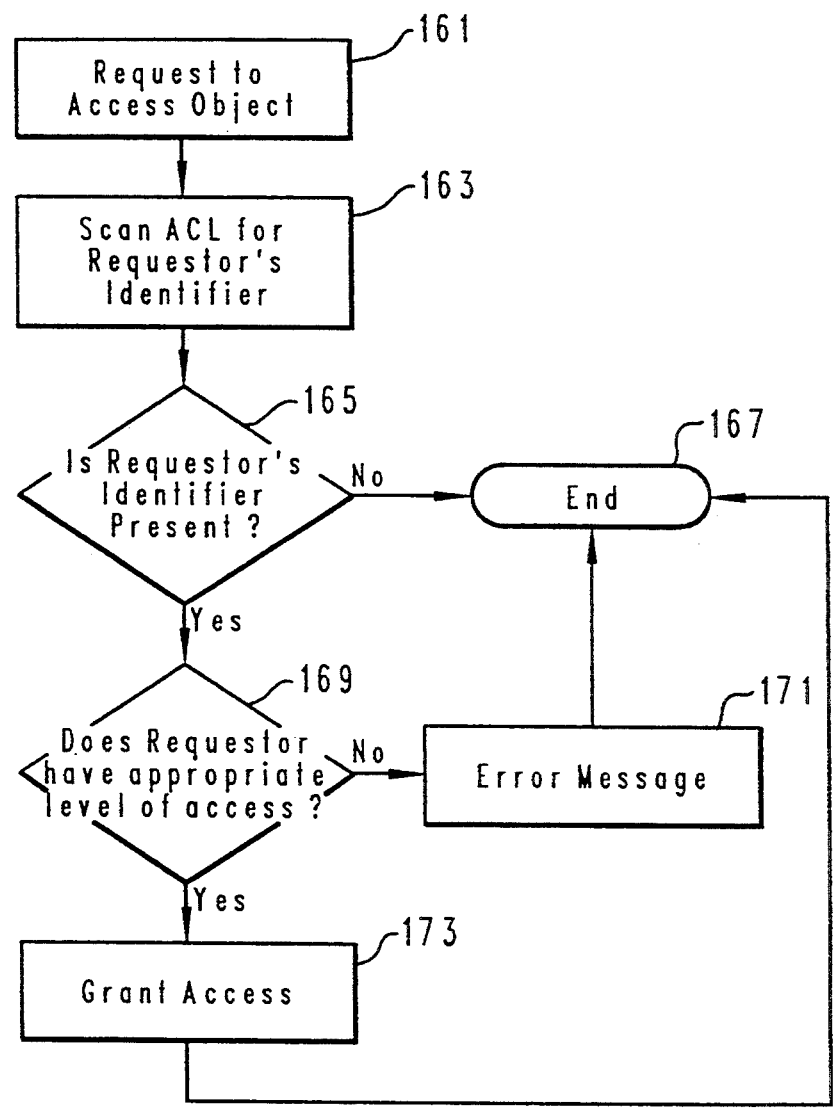

FIG. 5 shows the method of using the access control list. In step 161, a request to access the object is received. The access control list is scanned for the requesting security subject's identifier, step 163. The method in step 165 determines if the requestor's identifier is present. If NO, then the method ends, step 167. If the result of step 165 is YES, the method determines in step 169 if the requestor has the appropriate level of access. If the result of step 169 is NO, an error message is displayed, step 171 and the method ends, step 167. If the result of step 169 is YES, access is granted, step 173, and the method ends.

Figure 6:
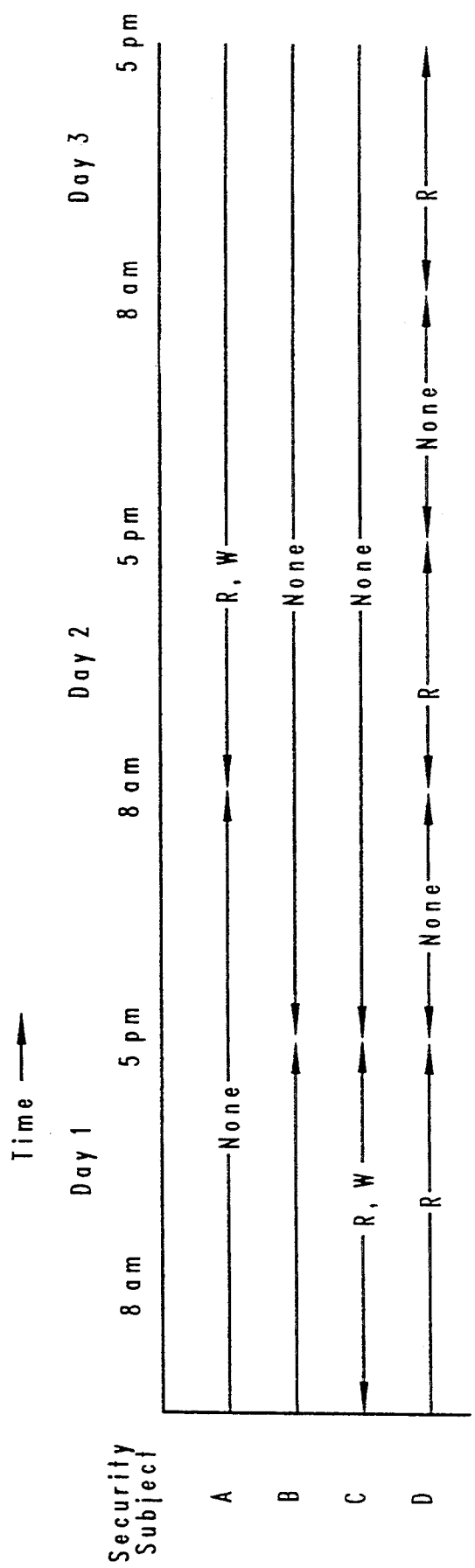
FIG. 6 is a sample temporal authorization schedule, which can be implemented with the present invention.

Referring now to FIG. 6, some examples of the present invention will be explained. In the first example, security subject A is to be given infinite access to an object, beginning at 8:00 am on Day 2. The request for security subject A is added to the request queue using the method of FIGS. 2A and 2B. The requestor adds the request to the request queue sometime before Day 2, 8:00 am. The request contains the following information: RA=invoke; OI is the name of the object to be invoked; IDA is whoever is making the request; IDB=security subject A; the beginning of A's schedule of accessing the object IR=Day 2, 8:00 am; the end of A's schedule is undetermined so DR is set greater than IR to some value such as Day 2, 10:00 am; IU and RU=0; and the authorization level AL is read and write. The method of FIGS. 2A and 2B determines, in steps 35, 43, 51 and 59, that the request is to be added to the request queue. In steps 63 et seq. the method verifies that the request is a valid request and adds the request to the queue, step 81.

The polling method of FIG. 3 polls the request queue every hour on the hour. At any time before Day 2, 8:00 am, the request of security subject A is read, step 89 and found not to be ready for processing, step 91. This is because IR, Day 2, 8:00 am, is greater than the current time. For example, during the polling that occurs at current time=Day 2, 7:00 am, IR is greater (or later) than current time.

When the request queue is polled at Day 2, 8:00 am, the request of security subject A is read and found to qualify for processing. Step 93 invokes the method of FIGS. 4A and 4B. In step 101 of FIG. 4A, the method determines that RA=invoke and IU=0 to proceed to steps 103 et seq. The authorization of IDA is verified, step 103, wherein security subject A is added to the access control list of the object OI, step 105. The request is then deleted from the request queue, step 107.

Thereafter (from Day 2, 8:00 am), whenever security subject A wishes to read or write to the object OI, the method of FIG. 5 is executed to grant security subject A access. The method scans the respective access control list for security subject A's identifier, step 163, and checks the level of access, step 169.

In the second example of FIG. 6, security subject B is to have its access to an object revoked on Day 1, 5:00 pm. The revocation request contains: RA=revoke; the object identifier OI; the identification of the requestor IDA; IDB=security subject B; the beginning of B's schedule of revoking access to the object IR=Day 1, 5:00 pm; the end of B's schedule is undetermined because the schedule is limited to a single event (revoking access) so DR=Day 1, 6:00 pm to be greater than IR; RU, IU=0; and the authorization level AL=all.

Sometime before Day 1, 5:00 pm, the request is added to the queue with the method of FIGS. 2A and 2B. At the polling time of Day 1, 5:00 pm, security subject B's request is read by the method of FIG. 3 and found to be eligible for processing. In step 93, the method of FIGS. 4A and 4B is invoked. The method of FIG. 4A passes through step 101 to step 111 because RA=revoke. Because IU=0, the method proceeds to step 113 for an authorization check of IDA. Assuming that IDA has authority, the method deletes security subject B from the access control list of the object OI, step 115. The request is deleted from the request queue, step 107. Thus, security subject B's access to the object is revoked at Day 1, 5:00 pm because security subject B is no longer on the access control list. After Day 1, 5:00 pm, security subject B is unable to access the object OI.

In the third example, security subject C is given a single access on Day 1 from 8:00 am through 5:00 pm. The single access request contains: RA=invoke; the object identifier OI; the identity of the requestor IDA; IDB=security subject C; the beginning of C's schedule IR=Day 1, 8:00 am; the end of C's schedule DR=Day 1, 5:00 pm; IU=9 hours (from 8:00 am to 5:00 pm); RU=0; and AL=read and write. The request is added to the queue using the method of FIGS. 2A and 2B. At the polling time of Day 1, 8:00 am, the method of FIG. 3 reads the request of security subject C and finds it to be eligible for processing. In step 93 of FIG. 3, the method of FIGS. 4A and 4B is invoked. The method of FIG. 4A passes through steps 101 and 111 to step 117 because IU is greater than 0. Because RA=invoke, IU is greater than 0 and RU=0, the method goes to step 119 to check the authorization of IDA. Assuming that IDA is authorized, security subject C is added to the access control list of the object OI, step 121. Thus, beginning at Day 1, 8:00 am, security subject C is given read and write access to the object OI.

The request is modified to enable revocation of security subject C's access at Day 1, 5:00 pm. In step 123, IR is advanced by 9 hours (the value of IU) from Day 1, 8:00 am to Day 1, 5:00 pm. In step 125, IU is set to 0 and in step 127, RA is set to invoke.

The modified request for security subject C then waits to be processed again. At the next polling time, Day 1, 9:00 am, the request of security subject C is not processed. This is because step 93 of FIG. 3 determines that IR (Day 1, 5:00 pm) is not less than or equal to current time (Day 1, 9:00 am). Because the request is not processed, security subject C's access remains intact and is not changed.

When current time becomes Day 1, 5:00 pm, then the request of security subject C will qualify for processing. The processing method of FIG. 4A passes through step 101, and on to step 111, where it determines that RA=revoke and IU=0. This is because the request was modified at Day 1, 8:00 am. In step 115, security subject C is deleted from the access control list and the request is deleted from the request queue, step 107. Thus, after Day 1, 5:00 pm, any attempt by security subject C to access object OI will be denied.

In the fourth example, security subject D is given cyclic access from 8:00 am to 5:00 pm every day for three days after which access is revoked. The cyclic access request contains: RA=invoke; the object identifier OI; the identity of the requestor IDA; IDB=security subject D; the beginning of D's schedule IR=Day 1, 8:00 am; the end of D's schedule DR=Day 3, 5:00 pm; IU=9 hours; RU=15 hours (from 5:00 pm to 8:00 am the next day); AL=read. The request is added to the request queue by the method of FIGS. 2A, 2B. At the polling time of Day 1, 8:00 am, the method of FIG. 3 determines that the request of security subject D qualifies for processing and the method of FIGS. 4A, 4B is invoked. The method goes through steps 101, 111, and 117 to step 129 because IU is greater than 0 and RU is greater than 0. In step 129, it is determined that RA=invoke, wherein security subject D is added to the access control list of the object OI, step 133 (assuming that the requestor IDA has authorization). Thus, beginning at Day 1, 8:00 am, security subject D can access object OI, but only for reading. Security subject D has insufficient authority for modifying or deleting the object.

After adding security subject D to the access control list, the request is modified to enable the revocation of access at Day 1, 5:00 pm. In step 135, IR is advanced by 9 hours (the value of IU) to Day 1, 5:00 pm and in step 137 RA is set to revoke. In step 139, the method checks if DR (Day 3, 5:00 pm) is greater than IR (Day 1, 5:00 pm) and finds that, YES, it is. The method then returns, step 143.

The modified request for security subject D is not processed again until Day 1, 5:00 pm because this is the new value of IR. At that time, security subject D's access is revoked by the method of FIGS. 4A, 4B. The method again goes through steps 101, 111 and 117 to step 129 because IU and RU are greater than 0. In step 129 it is determined that RA=revoke. In step 145, the authority of IDA is verified and in step 147, security subject D is deleted from the access control list. Then, in step 149, IR is advanced by 15 hours (the value of RU) from Day 1, 5:00 pm to Day 2, 8:00 am. In step 151, the method determines that DR (Day 3, 5:00 pm) is not greater than IR (Day 2, 8:00 am) and so RA is reset to invoke, step 153. This readies the request for providing access to security subject D when the request is processed on Day 2, 8:00 am. At Day 2, 8:00 am, access is again invoked.

In this manner, security subject D is cyclically provided access from 8:00 am to 5:00 pm and then denied access from 5:00 pm to 8:00 am the next day. When the request is processed on Day 3, 5:00 pm to revoke security subject D's access, step 149 sets IR=Day 4, 8:00 am. In step 151, it is determined that DR (Day 3, 5:00 pm) is not greater than IR (Day 4, 8:00 am). Therefore, the request is deleted from the queue, step 155, wherein the request will no longer be processed. This revokes security subject D's access on a permanent basis.

The foregoing disclosure and the showings made in the drawings are merely illustrative of the principles of this invention and are not to be interpreted in a limiting sense.

We claim:

1. A computer implemented method of controlling access in a data processing system, comprising the steps of:

a) providing a schedule of access for a security subject to access an object of said data processing system, said schedule containing one or more times, for each time there being a corresponding change in said access of said security subject to said object;

b) automatically determining if any one of said times in said schedule has occurred, said automatic determination occurring independently from actions taken by said security subject;

c) automatically implementing said change in said access to said object according to said schedule, said implementation of said change in access corresponding to said occurred time in said schedule; and d) repeating steps b) and c) if none of said times in said schedule have yet occurred or if there are other of said times in said schedules that have not yet occurred;

e) wherein said step of automatically implementing said access change further comprises the step of determining if there is authorization to implement said access change, and preventing implementation of said access change if it is determined that no authorization to implement the access change exists.

2. The method of claim 1 wherein:
a) said step of providing said schedule further comprises the step of providing a request for periodic access by providing a beginning of schedule time, an end of schedule time, a first window of time units and a second window of time units;
b) said step of automatically determining if any one of said times has occurred further comprises the steps of automatically determining if the beginning of schedule time has occurred, and automatically determining if the end of schedule time has occurred, and
c) said step of automatically implementing a change in said access further comprises the steps of alternately invoking said access for a length of time determined by said first window and revoking access for a length of time determined by said second window upon a determination that the beginning of schedule time has occurred, and revoking said access upon a determination that the end of schedule time has occurred.

3. The method of claim 1 wherein said step of providing said schedule further comprises the step of providing a request for a single access by providing a first time for invoking access of said security subject to said object and a second time for revoking said access.

4. The method of claim 1 wherein said step of automatically determining if any one of said times in said schedule has occurred further comprises periodically polling said schedule.

5. The method of claim 1 wherein said step of automatically implementing said access change further comprises the step of modifying an access control list of said object.

6. A data processing system having controlled access, comprising:
a) means for providing a schedule of access for a security subject to access an object of said data processing system, said schedule containing one or more times, for each time there being a corresponding change in said access of said security subject to said object;
b) means for automatically determining if any one of said times in said schedule has occurred, said means for automatically determining being coupled to said means for providing a schedule of access, said means for automatically determining operating independently from actions taken by said security subject; and
c) means for automatically implementing said access change that corresponds to said occurred time, said means for automatically implementing being coupled to said means for automatically determining and said means for automatically implementing being invoked by said means for automatically determining upon the determination that one of said times has occurred wherein said means for automatically implementing said access change further comprises means for automatically determining if there is authorization to implement said access change, and means for preventing implementation of said access change if it is determined that no authorization to implement the access change exists.

7. The system of claim 6 wherein:
a) said means for providing a schedule further comprises means for providing a request for periodic access that has a beginning of schedule time, an end of schedule time, a first window of time units and a second window of time units;
b) said means for automatically determining if any one of said times has occurred further comprises:
   i) means for automatically determining if the beginning of schedule time has occurred;
   ii) means for automatically determining if the end of schedule time has occurred;
c) said means for automatically implementing a change in access further comprises:
   i) means for alternately invoking said access for a length of time determined by said first window and revoking said access for a length of time determined by said second window, said means for alternately invoking and revoking said access being responsive to said means for automatically determining if the beginning of schedule time has occurred; and
   ii) means for revoking said access, said means for revoking said access being responsive to said means for automatically determining if the end of schedule time has occurred.

8. The system of claim 6 wherein said means for providing said schedule further comprises means for providing a request for a single access having a first time for invoking access of said security subject to said object and a second time for revoking said access.

9. The system of claim 6 wherein said means for automatically determining if any one of said times in said schedule has occurred further comprises means for periodically polling said schedule.

10. The system of claim 6 wherein said means for automatically implementing said access change further comprises means for modifying an access control list of said object.

* * * * *